United States Patent

Sugama (10) Patent No.: US 9,762,872 B2
(45) Date of Patent: Sep. 12, 2017

(54) APPARATUS, METHOD AND NON-TRANSITORY COMPUTER-READABLE STORAGE MEDIUM

(71) Applicant: FUJITSU LIMITED, Kawasaki-shi, Kanagawa (JP)

(72) Inventor: Yasushi Sugama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/254,021

(22) Filed: Sep. 1, 2016

(65) Prior Publication Data

US 2017/0104969 A1    Apr. 13, 2017

(30) Foreign Application Priority Data

Oct. 8, 2015 (JP) ................................ 2015-200498

(51) Int. Cl.
*H04N 9/31* (2006.01)
*G01B 11/25* (2006.01)

(52) U.S. Cl.
CPC ....... *H04N 9/3185* (2013.01); *G01B 11/2513* (2013.01)

(58) Field of Classification Search
CPC .......................... H04N 9/3185; G01B 11/2513
USPC ..................................................... 348/745
See application file for complete search history.

(56) References Cited

U.S. PATENT DOCUMENTS

| | | | | |
|---|---|---|---|---|
| 2005/0030486 A1* | 2/2005 | Lee | ...................... | H04N 9/3185 353/69 |
| 2005/0179875 A1* | 8/2005 | Aoyanagi | ................ | G03B 5/02 353/101 |
| 2012/0214546 A1* | 8/2012 | Osaka | ................. | H04M 1/0272 455/556.1 |
| 2013/0335751 A1 | 12/2013 | Hirota et al. | | |
| 2015/0195517 A1* | 7/2015 | Brown | ..................... | H04N 5/74 348/189 |

FOREIGN PATENT DOCUMENTS

| | | |
|---|---|---|
| JP | 2006-189712 | 7/2006 |
| JP | 2007-36482 | 2/2007 |
| JP | 2014-2033 | 1/2014 |
| JP | 2014-60611 | 4/2014 |
| JP | 2014-192808 | 10/2014 |

\* cited by examiner

*Primary Examiner* — Michael Lee
(74) *Attorney, Agent, or Firm* — Fujitsu Patent Center (57) ABSTRACT

An apparatus includes a projector to project an image, a three-dimensional sensor to measure three-dimensional data of an image projection range onto which the image is to be projected, and a processor to extract a plane area from the image projection range based on the three-dimensional data measured by the three-dimensional sensor, as a direction of the plane area, identify at least one of a long-side direction, a short-side direction, and a normal primary alignment direction of the plane area, using the direction of the plane area, perform a of an image area for the image to be projected by the projector with the plane area, and perform a secondary alignment of the image area with the plane area by performing a tracking process between a first contour of the image area aligned by the primary alignment and a sSpecond contour of the plane area.

20 Claims, 8 Drawing Sheets

APPARATUS, METHOD AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2015-200498, filed on Oct. 8, 2015, the entire contents of which are incorporated herein by reference.

FIELD

The embodiment discussed herein is related to an apparatus, method and a non-transitory computer-readable storage medium for example.

BACKGROUND

Projectors configured to project an image are widely used in these years. It is desirable that a projection surface onto which to project an image be plane in order that the image projected from the projector may be easy to see. Against this background, proposal has been made on a technique for automatically detecting a projection range suitable for a projector to project an image.

An information projection display apparatus is known which uses two markers set on a projection surface and a pre-specified base angle to define, as a projection area, a rectangular area whose opposite corners correspond to the two markers.

Meanwhile, another information presentation apparatus is configured to: project a lattice-pattern image onto a work area using a second projector; capture the projected lattice-pattern image using an infrared camera; extract plane areas by comparing the captured lattice-pattern image and the original lattice-pattern image; detect the plane area which is the largest and closest to a square among the extracted plane areas; and project presentation information onto the detected plane area using a first projector. Prior art documents include Japanese Laid-open Patent Publication Nos. 2007-36482 and 2006-189712.

SUMMARY

According to an aspect of the invention, an apparatus includes a projector configured to project an image, a three-dimensional sensor configured to measure three-dimensional data of an image projection range onto which the image is to be projected, and a processor coupled to the projector and the three-dimensional sensor, and configured to extract a plane area from the image projection range based on the three-dimensional data measured by the three-dimensional sensor, as a direction of the plane area, identify at least one of a long-side direction, a short-side direction, and a normal direction of the plane area, using the direction of the plane area, perform a primary alignment of an image area for the image to be projected by the projector with the plane area, and perform a secondary alignment of the image area with the plane area by performing a tracking process between a first contour of the image area aligned by the primary alignment and a second contour of the plane area.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

The foregoing technique disclosed in the former prior art document is based on the precondition that already-known markers are set in an area to be searched for a projection range in advance. However, in a case where the projector is used in an arbitrarily-chosen place, the markers are not often set there. Furthermore, the foregoing technique disclosed in the latter prior art document also has to use a separate projector configured to project a specialized image for detecting a plane area, in addition to the projector configured to project the image.

Hereinafter, referring to the drawings, descriptions will be provided for a projection apparatus. The projection apparatus obtains three-dimensional measurement data on a three-dimensional shape of the whole of an area to be searched for a projection range using a three-dimensional sensor, and detects plane areas based on the three-dimensional measurement data. For each detected plane area, the projection apparatus obtains the orientation of the plane area by applying a main component analysis to the coordinates of each point in the plane area. For each plane area, the projection apparatus obtains a model area whose orientation is aligned with the obtained orientation to serve as a model for the shape of a range onto which to project the image, and applies Iterative Closest Point (ICP) algorithm between the model area and a protruding contour of the plane area using the position of the model area as an initial position for ICP. Thereby, the projection apparatus accurately aligns the model area with the plane area. Thus, the projection apparatus projects the image onto the plane area by causing the image to be displayed in an image display area on a display screen of the projector, the image display area corresponding to the model area aligned with the plane area onto which to project the image, the plane area selected from the plane areas.

Figure 1:
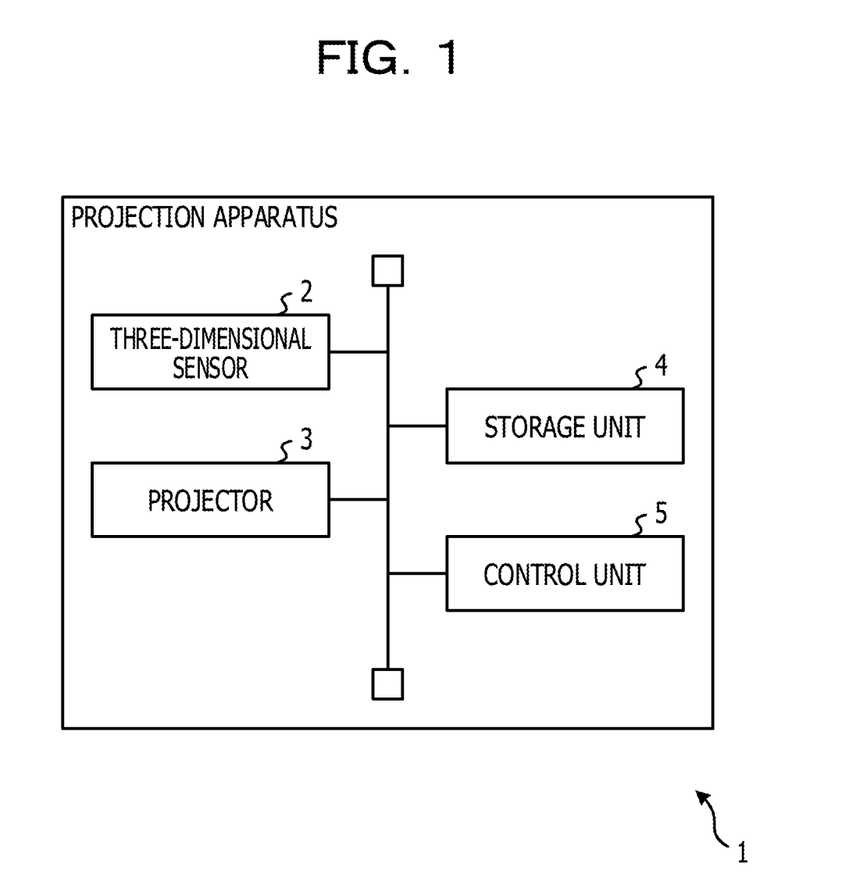
FIG. 1 is a hardware configuration diagram of a projection apparatus according to an embodiment.

FIG. 1 is a hardware configuration diagram of the projection apparatus according to an embodiment. The projection apparatus 1 includes a three-dimensional sensor 2, a projector 3, a storage unit 4, and a control unit 5. These parts included in the projection apparatus 1 is contained in a single housing (not illustrated), for example. The three-dimensional sensor 2, the projector 3 and the storage unit 4 are connected to the control unit 5 via a signal line. The projection apparatus 1 may further include a communications interface (not illustrated) for connecting the projection apparatus 1 to another apparatus.

The three-dimensional sensor 2 is installed directed in a projection direction of the projector 3, for example. The three-dimensional sensor 2 generates the three-dimensional measurement data on the inside of the area to be searched at a certain period (for example, 50 msec to 100 msec), or at predetermined timings such as before the image projection is started and each time images to be projected are switched. Incidentally, the area to be searched includes at least part of a range onto which the projector 3 is capable of projecting images. In addition, the three-dimensional sensor 2 outputs the generated three-dimensional measurement data to the control unit 5. To this end, a depth camera or a stereo camera, for example employing the Time-of-Flight method or the like may be used as the three-dimensional sensor 2. The three-dimensional measurement data includes, for example, the real spatial coordinates of each measurement point inside the area to be searched by the three-dimensional sensor 2, in a three-dimensional orthogonal coordinate system with its origin at a predetermined point (for example, the center of the sensor surface of the three-dimensional sensor 2).

The projector 3 is an example of a projection unit. The projector 3 is a liquid crystal projector, for example. The projector 3 projects an image by displaying the image on its display screen according to an image signal received from the control unit 5. In the embodiment, the projector 3 displays the image in an image display area obtained by the control unit 5, and thereby projects the image onto the projection range corresponding to the image display area.

The storage unit 4 includes a volatile or nonvolatile semiconductor memory circuit, for example. The storage unit 4 stores the three-dimensional measurement data obtained by the three-dimensional sensor 2, the image signal representing the image to be projected by the projector 3, and the like. The storage unit 4 may further store various information to be used for the image projection process.

The control unit 5 includes one or more processors and peripheral circuits. The control unit 5 controls the whole of the projection apparatus 1.

In addition, based on the three-dimensional measurement data, the control unit 5 detects the projection range onto which the projector 3 projects the image. In order for the image to be projected onto the detected projection range, the control unit 5 obtains the image display area on the display screen of the projector 3, and makes the projector 3 display the image, intended to be projected, on the image display area.

Hereinafter, descriptions will be provided for the image projection process to be performed by the control unit 5.

Figure 2:
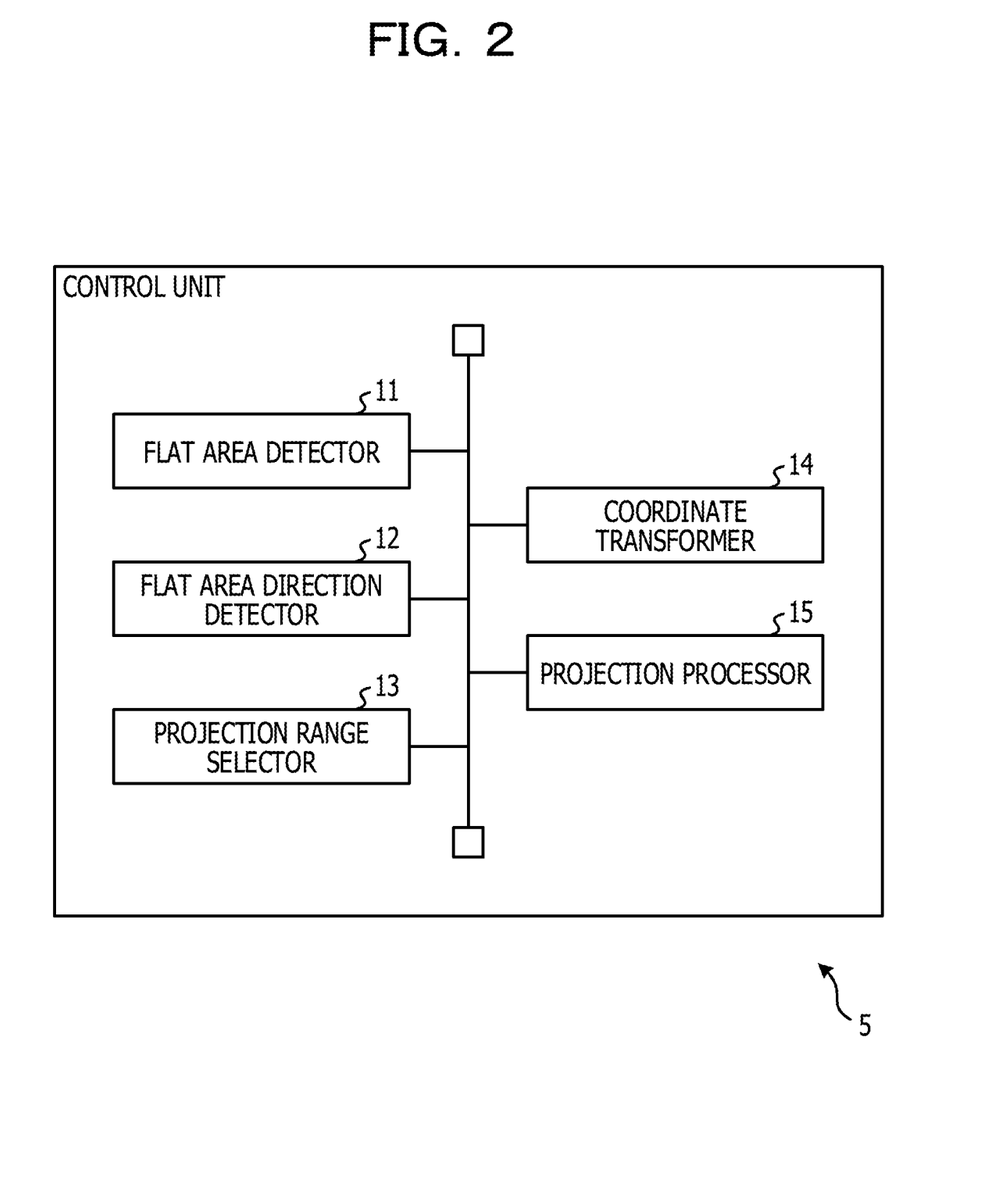
FIG. 2 is a functional block diagram of a control unit.

FIG. 2 is a functional block diagram of the control unit 5. The control unit 5 includes a plane area detector 11, the plane area direction detector 12, a projection range selector 13, a coordinate transformer 14, and a projection processor 15. These parts included in the control unit 5 are packaged as functional modules which are implemented by computer programs to be executed on a processor included in the control unit 5. Instead, these parts may be packaged, as one or more integrated circuits for performing the functions of the respective parts, in the projection apparatus 1 separately from the control unit 5.

From the three-dimensional measurement data obtained by the three-dimensional sensor 2, the plane area detector 11 detects the plane area in the area to be searched. In the embodiment, a set of measurement points between which a difference in normal direction is a predetermined value or less is detected as the plane area by the plane area detector 11 using the Region Growing method.

To this end, first of all, the plane area detector 11 obtains the normal directions of the measurement points included in the three-dimensional measurement data. For example, the plane area detector 11 first calculates the normals to planes each defined by three points selected from attention-focused and neighboring measurement points, and then obtains, as the normal to the attention-focused measurement point, a normal that has the minimum error from the calculated normals by using the method of least squares. Otherwise, the plane area detector 11 may define the normal of the attention-focused measurement point as the normal of a plane defined by three measurement points around the attention-focused measurement point, i.e., the three measurement points selected with the attention-focused measurement point set as the centroid.

After calculating the normals to all the measurement points, the plane area detector 11 obtains the set of measurement points between which a difference in normal direction is the predetermined value or less, using the Region Growing method. The plane area detector 11 defines the set as representing one plane area.

FIGS. 3A, 3B, 3C, and 3D are conceptual diagrams illustrating how to detect the plane area using the Region Growing method. First of all, in FIG. 3A, from the measurement points included in the three-dimensional measurement data, a measurement point whose normal direction satisfies a predetermined criterion is selected and set as a seed point 301 by the plane area detector 11. The plane area detector 11 assigns the seed point 301 a unique label. Incidentally, the predetermined criterion may be that an angle of the normal direction to a direction of the optical axis of the projector 3 is equal to or less than a predetermined angle (for example, 30 degrees) in order that the image to be projected by the projector 3 may be easily seen from users, for example.

Figures 3A, 3B:
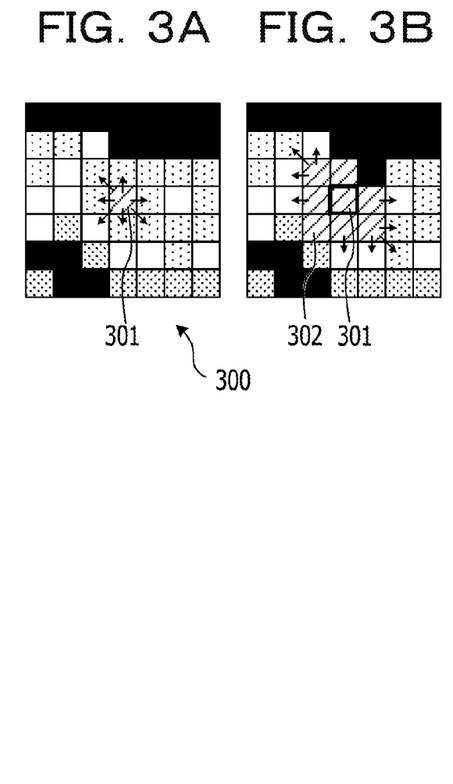
FIGS. 3A, 3B, 3C, and 3D are conceptual diagrams each illustrating how to detect a plane area using the Region Growing method.

Subsequently, as illustrated in FIG. 3B, from the neighboring measurement points adjacent to the seed point 301, a measurement point 302 whose normal direction deviates from the normal direction of the seed point 301 by a predetermined angle or less is selected by the plane area detector 11. The plane area detector 11 assigns the measurement point 302 the same label as is assigned to the seed point 301. In other words, the plane area detector 11 defines the measurement point 302 and the seed point 301 as belonging to a set of measurement points which represent the same plane area. Incidentally, the plane area detector 11 does not have to add a measurement point which is already assigned another label in the region grown from the seed point 301 (that is, the plane area detector 11 does not assign the measurement point the same label as is assigned to the seed point 301). In this point, the predetermined angle is 3 degrees, for example.

Figure 3C:
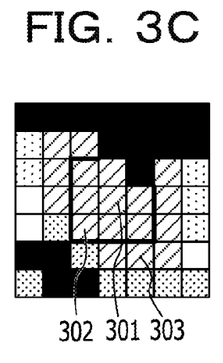
Figure 3D:
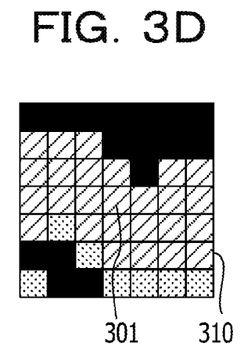

As illustrated in FIG. 3C, the plane area detector 11 repeats the same label assignment process. To put it specifically, from the measurement points adjacent to the measurement point 302 which is assigned the same label as is assigned to the seed point 301, a measurement point 303 whose normal direction deviates from the normal direction of the measurement point 302 by the predetermined angle or less is identified by the plane area detector 11. The plane area detector 11 assigns the measurement point 303 the same label as is assigned to the seed point 301. The plane area detector 11 terminates the process starting with the seed point 301, when the difference between the normal direction of the measurement point 302 and the normal direction of any measurement point adjacent to the measurement point 302 assigned the same label as is assigned to the seed point 301 becomes greater than the predetermined angle. In that case, as illustrated in FIG. 3D, the plane area detector 11 defines one plane area 310 as a set consisting of the seed point 301 and the measurement points each assigned the same label as is assigned to the seed point 301.

The plane area detector 11 detects at least one plane area by repeating the foregoing process until all measurement points whose respective normal directions satisfying the predetermined criterion are assigned the label.

For each detected plane area, the plane area detector 11 detects a protruding contour. For example, from the measurement points included in an attention-focused plane area, measurement points each not having more than one neighboring measurement point included in the attention-focused plane area are detected as contour measurement points representing the contour of the attention-focused plane area by the plane area detector 11. In addition, from the contour measurement points, the plane area detector 11 identifies contour measurement points each making the inner product of two vectors each joining the contour measurement point and an arbitrarily-chosen measurement point in the attention-focused plane area, become equal to or greater than 0 (zero). Each identified contour measurement point is a point at a corner of the plane area whose angle is equal to or less than 90 degrees. Thereby, the plane area detector 11 defines the protruding contour of the attention-focused plane area as a contour obtained by joining the identified contour measurement points.

Figure 4:
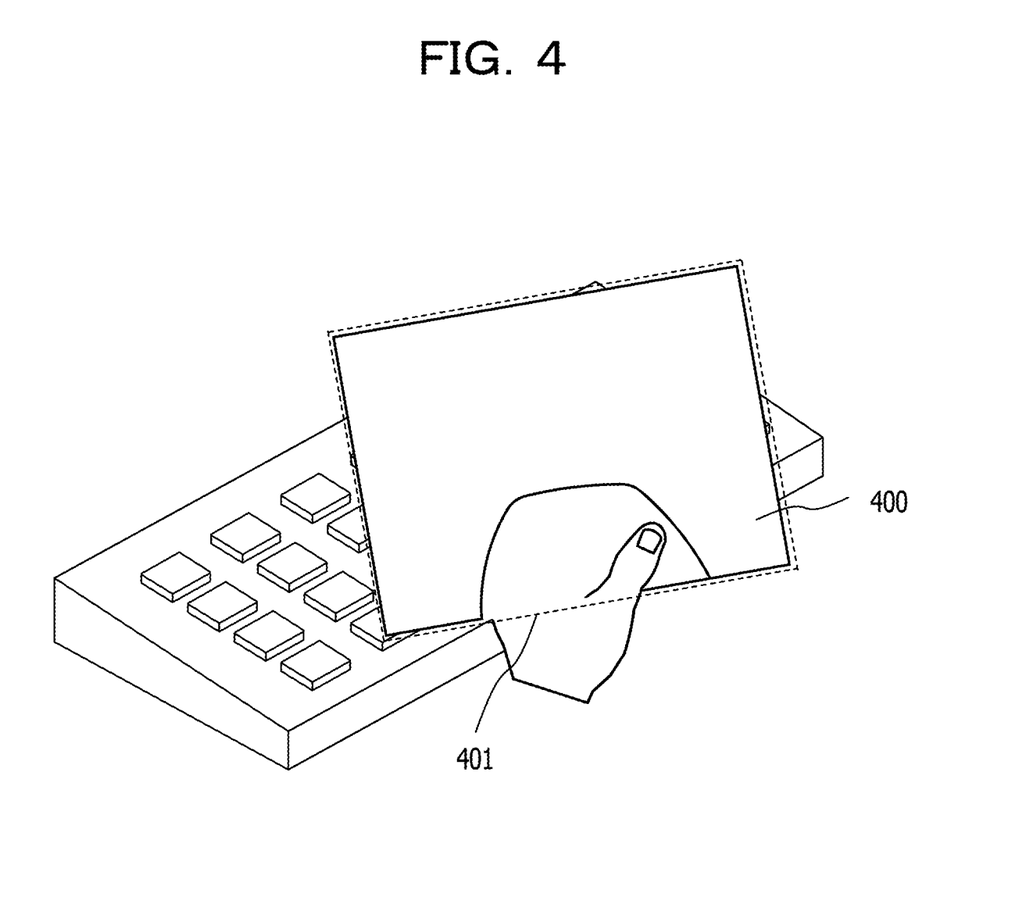
FIG. 4 is a diagram illustrating an example of the detected plane area and its protruding contour.

FIG. 4 is a diagram illustrating an example of a detected plane area and its protruding contour. In this example, a plane area 400 is indicated with a solid line, and a part of its rectangle is missing because of the existence of another object. However, because the missing part is set back inward, the shape of a protruding contour 401 indicated with a chain line is similar to an original contour shape of the plane area 400.

The plane area detector 11 stores information on each plane area, for example the labels assigned to the respective measurement points in each plane area, into the storage unit 4. Furthermore, for each plane area, the plane area detector 11 stores information on the protruding contour of the plane area (for example, the coordinates of each measurement point on the contour of the plane area), into the storage unit 4.

For each plane area detected by the plane area detector 11, the plane area direction detector 12 detects the orientation of the plane area. In the embodiment, applying the main component analysis to each plane area, the plane area direction detector 12 calculates the long-side, short-side and normal directions of the plane area. Then, the plane area direction detector 12 moves the model area representing the shape of the projection range set in advance such that the model area is aligned with the obtained long-side, short-side and normal directions. The plane area direction detector 12 performs the tracking process, such as ICP, between the model area and the protruding contour of the plane area using the position of the moved model area as the initial position for ICP, and thereby aligns the orientation and position of the model area with the orientation and position of the plane area.

The plane area direction detector 12 performs the main component analysis on the attention-focused plane area by inputting the three-dimensional coordinates of each measurement point included in the plane area.

Figure 5:
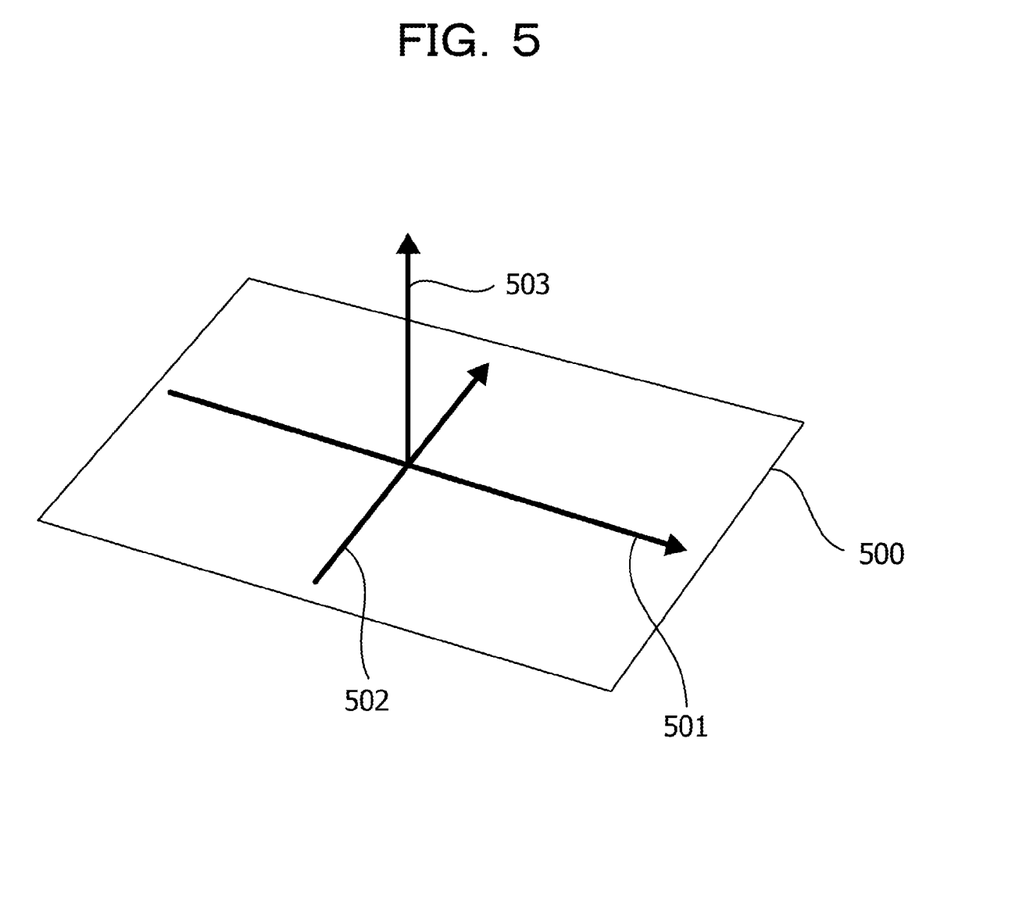
FIG. 5 is a diagram illustrating a relationship among the plane area and directions obtained by performing a main component analysis.

FIG. 5 is a diagram illustrating a relationship among the plane area and the directions obtained by performing the main component analysis. Once the main component analysis is performed by inputting the three-dimensional coordinates of each measurement point included in a plane area 500, a long-side direction 501 of the plane area 500 is obtained as the main component. Then, a direction which has the second largest number of components between the directions orthogonal to the long-side direction 501 which is the main component is obtained as a short-side direction 502 of the plane area 500. Thereby, a normal direction 503 of the plane area 500 is obtained as the direction orthogonal to the long-side direction 501 and the short-side direction 502.

For each plane area, the plane area direction detector 12 moves the model area representing the projection range to the position of the plane area using a parallel displacement vector and a rotation matrix determined by the long-side, short-side and normal directions of the plane area, and thereby uses the position of the moved model area as the initial position for ICP.

Figure 6:
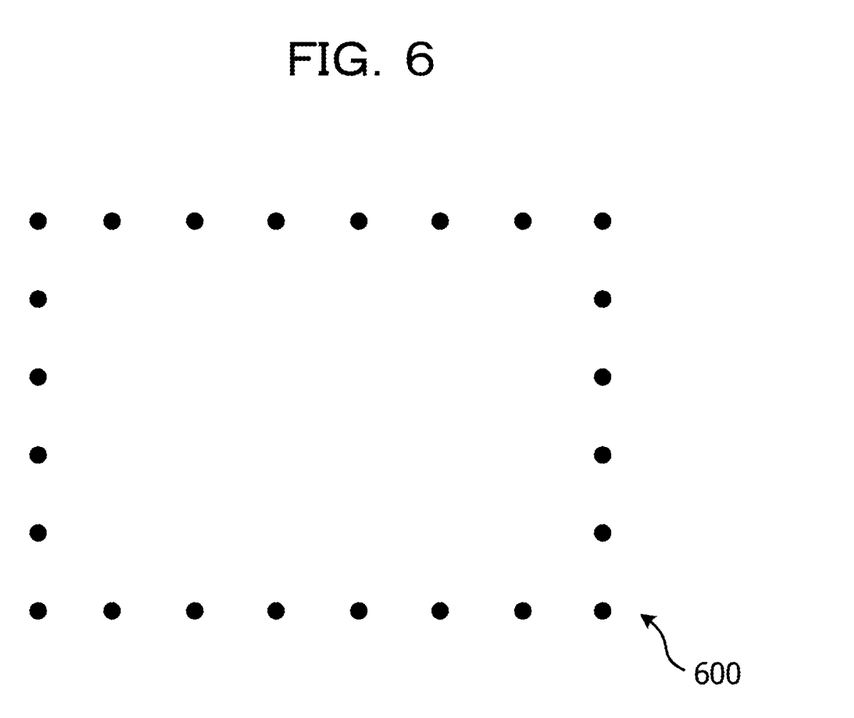
FIG. 6 is a diagram illustrating an example of a model area representing a projection range.

FIG. 6 is a diagram illustrating an example of the model area representing the projection range. For example, a model area 600 at a position of a predetermined distance (for example, 1 meter) from the projector 3 has the same shape as does the contour shape of the range onto which the projector 3 projects the image. In this example, the model area 600 is represented by a rectangle-shaped contour line.

The plane area direction detector 12 moves the model area to the position of the attention-focused plane area according to Equation (1):

$$p'_n = Rp_n + t \quad (1)$$

where: $p_n$ denotes the three-dimensional coordinates of each point in the model area before the movement; $p'_n$ denotes the three-dimensional coordinates of each point in the model area after the movement; t denotes a parallel displacement vector representing an amount of parallel displacement, for example an amount of movement from the centroid of the model area to the centroid of the attention-focused plane area; and R denotes a rotation matrix. The rotation matrix is expressed with Equation (2):

$$R = \begin{pmatrix} T_x & B_x & N_x \\ T_y & B_y & N_y \\ T_z & B_z & N_z \end{pmatrix} \quad (2)$$

where: $(T_x, T_y, T_z)$ respectively represent the x-, y- and z-axis direction components of a unit vector representing the long-side direction orientation of the attention-focused plane area; $(B_x, B_y, B_z)$ respectively represent the x-, y- and z-axis direction components of a unit vector representing the short-side direction orientation of the attention-focused plane area; and $(N_x, N_y, N_z)$ respectively represent the x-, y- and z-axis direction components of a unit vector representing the normal direction orientation of the attention-focused plane area. In this respect, the x-, y- and z-axis directions respectively represent the directions of the axes of the three-dimensional orthogonal coordinate system with its origin at the center of the sensor surface of the three-dimensional sensor 2.

For each plane area, after moving the model area to the position of the plane area, the plane area direction detector 12 performs ICP between the model area and the protruding contour of the plane area using the position of the moved model area as the initial position for ICP. Thereby, for each plane area, the plane area direction detector 12 is able to calculate the amount of parallel displacement and the rotation matrix for aligning the orientation and position of the model area with the orientation and position of the plane area. Incidentally, the plane area direction detector 12 may employ another tracking process, instead of ICP, to calculate the amount of parallel displacement and the rotation matrix for aligning the orientation and position of the model area with the orientation and position of the plane area.

The plane area direction detector 12 aligns the orientation and position of the model area with the orientation and position of the attention-focused plane area according to Equation (3):

$$p''_n = (Rp_n + t)R' + t' \qquad (3)$$

where: $p''_n$ denotes the three-dimensional coordinates of a point corresponding to a point $p_n$ in the model area, and reflecting the alignment of the model area with the attention-focused plane area; and t' and R' respectively represent the amount of parallel displacement and the rotation matrix which are calculated using ICP.

Figure 7A:
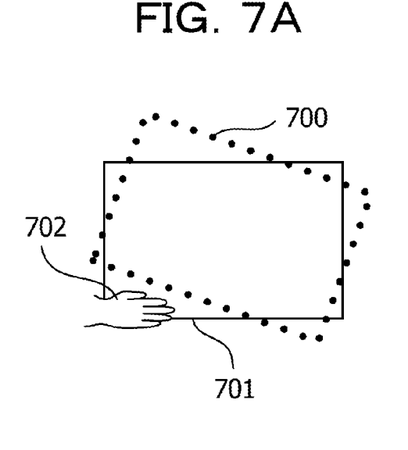
FIG. 7A is a diagram illustrating a result of moving the model area using a rotation matrix and a parallel displacement vector which are obtained by performing the main component analysis on the plane area.

FIG. 7A is a diagram illustrating a result of moving the model area using the rotation matrix and the parallel displacement vector which are obtained by performing the main component analysis on the plane area. A model area 700 indicated with a dashed line is moved relatively close to a plane area 701 using the rotation matrix and the parallel displacement vector which are obtained by performing the main component analysis on the plane area 701. However, the alignment using only the result of the main component analysis does not make the model area 700 completely coincide with the plane area 701, for example because such alignment does not reduce errors caused by influence of things such as an object 702 hiding part of the plane area 701.

Figure 7B:
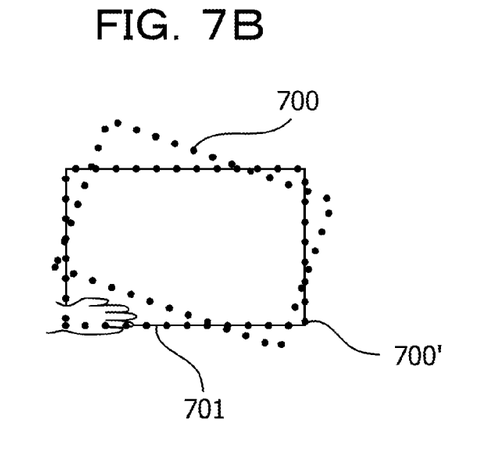
FIG. 7B is a diagram illustrating a positional relationship between the plane area and the model area which is moved based on a result of the main component analysis and subjected to ICP.

FIG. 7B is a diagram illustrating a positional relationship between the plane area and the model area which is moved based on a result of the main component analysis and subjected to ICP. As illustrated in FIG. 7B, the model area 700 is moved based on the rotation matrix and the like which are obtained by performing ICP between the model area 700 and the protruding contour of the plane area 701 using the position of the model area 700 after its movement as the initial position for ICP. The moved model area 700' (indicated with a dashed line) is well aligned with the plane area 701.

Figure 7C:
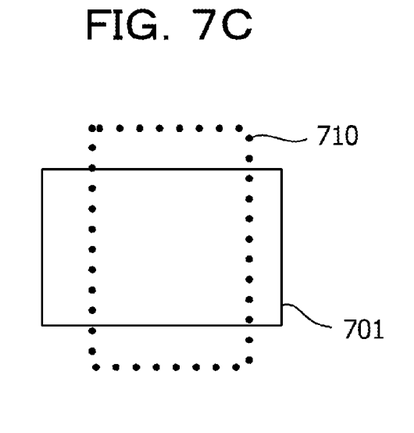
FIG. 7C is a diagram illustrating, as a reference, an example of a result of aligning the model area with the plane area using only ICP.

FIG. 7C is a diagram illustrating, as a reference, an example of a result of aligning the model area with the plane area without using the rotation matrix and the like which are obtained by performing the main component analysis on the plane area. In a case where, as illustrated in FIG. 7C, the position of the model area which is used as the initial position for performing ICP is away from the plane area to a large extent, there is likelihood that the rotation matrix or the like obtained using ICP becomes a local minimum solution, but not an optimum solution. Thus, there is likelihood that, as illustrated in FIG. 7C, the position of a model area 710 aligned using only ICP does not exactly coincide with the actual position of the plane area 701. The above-discussed use of both the main component analysis and ICP makes it possible for the plane area direction detector 12 to align the orientation and position of the model area with the orientation and position of the plane area well.

For each plane area, the plane area direction detector 12 stores information on the position, and long-side, short-side and normal directions of the model area aligned with the plane area into the storage unit 4.

From the plane areas detected by the plane area detector 11, a plane area onto which the projector 3 projects the image is selected as the projection range by the projection range selector 13.

For example, for each plane area, the projection range selector 13 rotates the position of each measurement point in the plane area using the rotation matrix given by Equation (2) which is obtained as the result of the main component analysis on the plane area. Thereby, each plane area is rotated about the origin such that: the long-side direction becomes parallel to the x-axis direction; and the short-side direction becomes parallel to the y-axis direction. Thereafter, for each rotated plane area, the projection range selector 13 calculates a width W of the plane area in the x-axis direction, and a height H of the plane area in the y-axis direction. Subsequently, for each rotated plane area, the projection range selector 13 calculates a difference (W−Wm) between the width W and a width Wm of the corresponding model area in its long-side direction, as well as a difference (H−Hm) between the height H and a height Hm of the model area in its short-side direction. Then, a plane area which minimizes the sum of the square of the difference (W−Wm) and the square of the difference (H−Hm) is selected as the projection range by the projection range selector 13.

The projection range selector 13 send the coordinate transformer 14 information on the plane area selected as the projection range, for example the label corresponding to the plane area.

The coordinate transformer 14 is an example of a display area identifying unit. The coordinate transformer 14 identifies the image display area, which corresponds to the projection range, on the display screen of the projector 3 by coordinate transformation from the projection range to the display screen of the projector 3.

In the embodiment, the coordinate transformer 14 transforms the three-dimensional coordinates of each of the four corners of the model area, which is aligned with the plane area set in the projection range, to the two-dimensional coordinates on the display screen of the projector 3 according to Equation (4). The coordinate transformer 14 defines the image display area as an area having four corners which are obtained by the coordinate transformation. Equation (4) is expressed with Equation (4):

$$s \begin{bmatrix} u \\ v \\ 1 \end{bmatrix} = \begin{pmatrix} f_x & 0 & c_z \\ 0 & f_y & c_y \\ 0 & 0 & 1 \end{pmatrix} ( R_{cp} \quad T_{cp} ) \begin{bmatrix} X \\ Y \\ Z \\ 1 \end{bmatrix} \qquad (4)$$

$$R_{cp} = \begin{pmatrix} r_{11} & r_{12} & r_{13} \\ r_{21} & r_{22} & r_{23} \\ r_{31} & r_{32} & r_{33} \end{pmatrix}, T_{cp} = \begin{pmatrix} t_1 \\ t_2 \\ t_3 \end{pmatrix}$$

where: ($f_x$, $f_y$) denote the focal lengths of a projection optical system (not illustrated) which the projector 3 has, the focal lengths being those in the horizontal and vertical directions on the display screen of the projector 3; ($c_x$, $c_y$) denote the horizontal and vertical coordinates of the center of the display screen of the projector 3; $R_{cp}$ and $T_{cp}$ respectively denote the rotation matrix and the parallel transformation vector which are transformation parameters for the coordinate transformation from the three-dimensional coordinate system based on the three-dimensional sensor 2 to the three-dimensional coordinate system based on the display screen of the projector 3; (X, Y, Z) denote the three-dimensional coordinates of an attention-focused point (in this example, one of the four corners of the model area which is aligned with the plane area set in the projection range) in the three-dimensional orthogonal coordinate system based on the three-dimensional sensor 2; and (u, v) denote the two-dimensional coordinates of a point, which corresponds to the attention-focused point, on the display screen of the projector 3.

The coordinate transformer 14 notifies the projection processor 15 of the coordinates of each of the points representing the four corners of the image display area.

The projection processor 15 causes a desired image to be displayed on the image display area on the display screen of the projector 3. Thereby, the image is projected onto the projection range. For example, in shops, libraries, museums and the like, an image including things such as information on an article on display is projected onto a plane area near the article.

Figure 8:
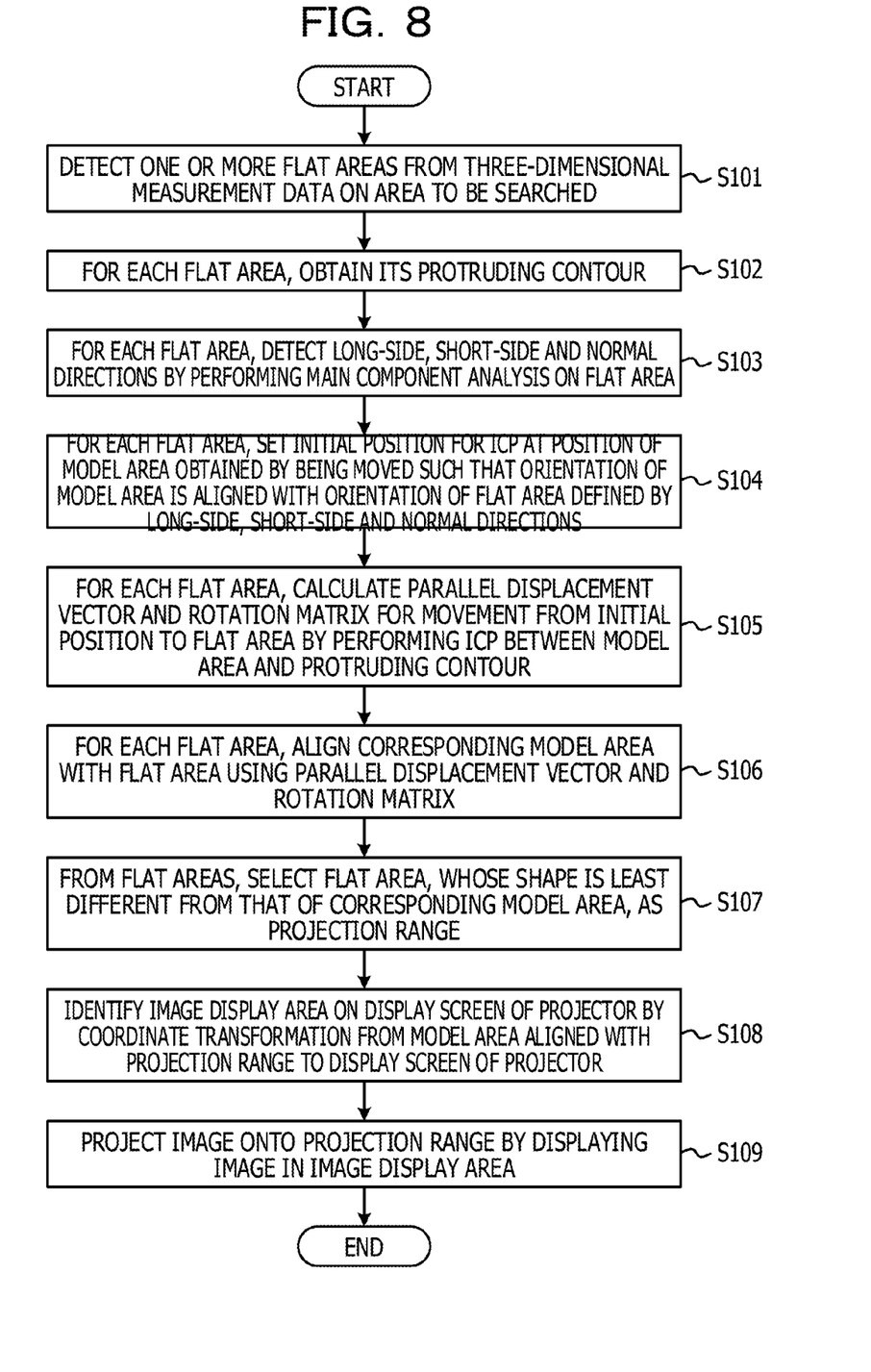
FIG. 8 is an operation flowchart of an image projection process.

FIG. 8 is an operation flowchart of the image projection process.

The plane area detector 11 detects one or more plane areas from the three-dimensional measurement data on the area to be searched which is obtained from the three-dimensional sensor 2 (in step S101). Thereafter, for each detected plane area, the plane area detector 11 obtains the protruding contour of the plane area (in step S102).

For each detected plane area, the plane area direction detector 12 detects the long-side, short-side and normal directions by performing the main component analysis on the plane area (in step S103). Thereafter, for each detected plane area, the plane area direction detector 12 aligns the orientation of the model area in the projection range with the orientation of the plane area defined by the long-side, short-side and normal directions to determine the initial position for ICP (in step S104).

For each detected plane area, the plane area direction detector 12 calculates the rotation matrix and the parallel displacement vector for the movement from the initial position to the plane area by performing the tracking process, such as ICP, between the model area at the initial position and the protruding contour of the plane area (in step S105). Thereafter, for each detected plane area, the plane area direction detector 12 aligns the corresponding model area with the plane area based on the rotation matrix and the parallel displacement vector (in step S106).

From the detected plane areas, a plane area whose shape is the least different from the corresponding model area is selected as the projection range by the projection range selector 13 (in step S107). Thereafter, the coordinate transformer 14 identifies the image display area by the coordinate transformation from the model area aligned with the plane area corresponding to the projection range to the display screen of the projector 3 (in step S108).

The projection processor 15 projects the desired image in the projection range by displaying the image in the image display area on the display screen of the projector 3 (in step S109). With this, the control unit 5 completes the image projection process.

As discussed above, the projection apparatus detects one or more plane areas based on the three-dimensional measurement data on the area to be searched on which to project the image. The projection apparatus sets the initial position for ICP at the position of the model area for the projection range with the orientation of the model area aligned with that of the plane area defined by the long-side, short-side and normal directions of the detected plane area which are obtained by performing the main component analysis on the plane area. Thus, the projection apparatus is capable of accurately aligning the model area with the plane area by performing the tracking process, such as ICP, between the model area at the initial position and the protruding contour of the plane area. For this reason, the projection apparatus is capable of identifying the plane area to be used as the projection range suitable to project the image, although no marker is provided to the area to be searched, although the projection apparatus is provided with no projector configured to project a specialized pattern for measuring the distance, and even if the area to be searched includes a plain object. In addition, the projection apparatus is capable of projecting the desired image onto the projection range, since the projection apparatus identifies the image display area on the display screen of the projector by the coordinate transformation from the model area aligned with the plane area to be used as the projection range.

In a modification, the plane area direction detector 12 may detect the long-side, short-side and normal directions of each detected plane area using a method different from the main component analysis. For example, the plane area direction detector 12 may be configured as follows. For each vector joining two arbitrarily-chosen measurement points on the attention-focused protruding contour, the plane area direction detector 12 calculates the direction of the vector. Based on the calculated directions of the respective vectors, the plane area direction detector 12 constructs a histogram representing a frequency of the direction of the vector calculated for each predetermined angle range (for example, 10 degrees). Then, referring to the thus-constructed histogram, the plane area direction detector 12 selects the center direction of an angle range having the highest frequency as the long-side direction of the plane area. Otherwise, the plane area direction detector 12 may select a direction represented by the mean or median of the directions of the vectors, which are included in the angle range having the highest frequency, as the long-side direction of the plane area. Thereafter, from the directions orthogonal to the long-side direction, the plane area direction detector 12 may select a direction of an angle range having the second highest frequency as the short-side direction of the plane area. Furthermore, the plane area direction detector 12 may select a direction orthogonal to the long-side and short-side directions as the normal direction.

This modification makes it possible for the plane area direction detector 12 to detect the orientation of the plane area with an amount of calculation which is smaller than that requested for the main component analysis.

According to another modification, for each of the plane areas detected by the plane area detector 11, the control unit 5 may change the size of the corresponding model area depending on the distance from the three-dimensional sensor 2 to the plane area. For example, the control unit 5 may be configured as follows. Based on the three-dimensional coordinates of each measurement point included in the detected plane area, the control unit 5 calculates three-dimensional coordinates of the centroid of the plane area, and calculates the distance between the centroid and the projector 3. Thereafter, the control unit 5 may correct the lengths of the corresponding model area in the long-side and short-side directions by multiplying the lengths of the model area in the long-side and short-side directions by a ratio of the distance between the centroid of the plane area and the projector 3 to a predetermined distance. Thereby, as the distance of the plane area from the projector 3 becomes larger, the range onto which to project the image becomes wider. Accordingly, the projection apparatus is capable of appropriately setting the size of the projection range for the image according to the distance from the projection apparatus to the plane onto which to project the image.

According to yet another modification, the projection range or the model area does not have to be the rectangular one. For example, the projection range and the model area each may be elliptic. In this case, too, the control unit 5 may align the model area with the plane area by performing the same process as discussed above on a circumscribed rectangle of the model area, for example. Otherwise, the control unit 5 may align the model area with the plane area by: obtaining an inscribed ellipse of the detected plane area instead of the protruding contour; and using this inscribed ellipse for ICP. Furthermore, the control unit 5 may obtain the image display area by transforming the coordinates of each of the two ends of the major axis of, and the coordinates of each of the two ends of the minor axis of, the ellipse corresponding to the projection range.

According to still another modification, from the multiple plane areas, the projection range selector 13 may select a plane area nearest or farthest from the projector 3 as the projection range. Instead, the projection range selector 13 may set multiple projection ranges. In this case, plane areas each making the sum of the squares of the width and height differences between the protruding contour of the plane area and the corresponding model area become equal to or less than a predetermined value may be selected as the projection ranges by the projection range selector 13; or a predetermined number of plane areas may be selected as the projection ranges by the projection range selector 13 in ascending order of the sum of the squares of the width and height differences between the protruding contour of each plane area and the corresponding model area. In the case where the projection range selector 13 selects the multiple projection ranges, the coordinate transformer 14 may obtain the image display area for each of the multiple projection ranges. Meanwhile, the projection processor 15 may cause the same image to be displayed in all of the multiple image display areas, or may cause different images to be displayed respectively in all of the multiple image display areas.

All examples and specific languages recited herein are intended for pedagogical purposes for aiding the reader in understanding the invention and the concepts contributed by the inventor to furthering the art, and are to be construed without limitation to the organization of any example in the specification, nor such specifically recited examples and conditions, which relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An apparatus comprising:
   a projector configured to project an image;
   a three-dimensional sensor configured to measure three-dimensional data of an image projection range onto which the image is to be projected; and
   a processor coupled to the projector and the three-dimensional sensor, and configured to:
   determine whether a first area included in the image projection range is a plane area based on the three-dimensional data measured by the three-dimensional sensor,
   when the processor determines that the first area is the plane area, as a direction of the plane area, identify at least one of a long-side direction, a short-side direction, and a normal direction of the plane area,
   using the direction of the plane area, perform a primary alignment of an image area for the image to be projected by the projector with the plane area, and
   perform a secondary alignment of the image area with the plane area by performing a tracking process between a first contour of the image area aligned by the primary alignment and a second contour of the plane area.

2. The apparatus according to claim 1, wherein
   the image area has a rectangular shape, and
   the processor is configured to determine whether the first area is the plane area having a rectangular shape.

3. The apparatus according to claim 1, wherein
   the secondary alignment is the tracking process using an Iterative Closest Point algorithm.

4. The apparatus according to claim 2, wherein
   the processor is further configured to obtain a protruding contour of the plane area as the second contour.

5. The apparatus according to claim 1, wherein
   for each of a plurality of measurement points included in the three-dimensional data, the processor is configured to obtain the normal direction of a plane of the image projection range including the measurement point, and
   the processor is configured to extract a set of a plurality of measurement points between which a difference in the normal direction falls within a predetermined range as the second contour of the plane area.

6. The apparatus according to claim 1, wherein
   the processor is configured to identify the direction of the plane area by applying a main component analysis to the three-dimensional data on a plurality of measurement points in the plane area.

7. The apparatus according to claim 1, wherein,
   based on the three-dimensional data, the processor is configured to identify the direction of the plane area based on a frequency of a direction of a vector joining each arbitrarily-chosen two of a plurality of measurement points on the second contour of the plane area.

8. The apparatus according to claim 1, wherein
   the processor is further configured to, when there exist a plurality of the plane areas, select the plane area which minimizes a difference in shape between the first contour of the image area and the second contour of the plane area.

9. A method using a projector configured to project an image, a three-dimensional sensor configured to measure three-dimensional data of an image projection range onto which the image is to be projected, and a processor coupled to the projector apparatus and the three-dimensional sensor, the method comprising:

determining, by the processor, whether a first area included in the image projection range is a plane area based on the three-dimensional data measured by the three-dimensional sensor;

when the determining determines that the first area is the plane area, as a direction of the plane area, identifying, by the processor, at least one of a long-side direction, a short-side direction, and a normal direction of the plane area;

using the direction of the plane area, performing, by the processor, a primary alignment of an image area for the image to be projected by the projector apparatus with the plane area; and performing, by the processor, a secondary alignment of the image area with the plane area by performing a tracking process between a first contour of the image area aligned by the primary alignment and a second contour of the plane area.

10. The method according to claim 9, wherein
the image area has a rectangular shape, and
the plane area has a rectangular shape.

11. The method according to claim 9, wherein the secondary alignment is the tracking process using an Iterative Closest Point algorithm.

12. The method according to claim 10, further comprising:
obtaining, by the processor, a protruding contour of the plane area as the second contour.

13. The method according to claim 9, further comprising:
for each of a plurality of measurement points included in the three-dimensional data, obtaining, by the processor, the normal direction of a plane of the image projection range including the measurement point; and
extracting, by the processor, a set of a plurality of measurement points between which a difference in the normal direction falls within a predetermined range as the second contour of the plane area.

14. The method according to claim 9, wherein
the identifying includes identifying the direction of the plane area by applying a main component analysis to the three-dimensional data on a plurality of measurement points in the plane area.

15. The method according to claim 9, wherein
based on the three-dimensional data, the identifying includes identifying the direction of the plane area based on a frequency of a direction of a vector joining each arbitrarily-chosen two of a plurality of measurement points on the second contour of the plane area.

16. The method according to claim 9, further comprising:
when there exist a plurality of the plane areas, selecting, by the processor, the plane area which minimizes a difference in shape between the first contour of the image area and the second contour of the plane area.

17. A non-transitory computer-readable storage medium storing a program that causes an information processing apparatus to execute a process, the information processing apparatus being coupled to a projector configured to project an image and a three-dimensional sensor configured to measure three-dimensional data of an image projection range onto which the image is to be projected, the process comprising:

determining whether a first area included in the image projection range is a plane area based on the three-dimensional data measured by the three-dimensional sensor;

when the determining determines that the first area is the plane area, as a direction of the plane area, identifying at least one of a long-side direction, a short-side direction, and a normal direction of the plane area;

using the direction of the plane area, performing a primary alignment of an image area for the image to be projected by the projector with the plane area; and performing a secondary alignment of the image area with the plane area by performing a tracking process between a first contour of the image area aligned by the primary alignment and a second contour of the plane area.

18. The non-transitory computer-readable storage medium according to claim 17, wherein
the image area has a rectangular shape, and
the plane area has a rectangular shape.

19. The non-transitory computer-readable storage medium according to claim 17, wherein the secondary alignment is the tracking process using an Iterative Closest Point algorithm.

20. The non-transitory computer-readable storage medium according to claim 18, the process further comprising:
obtaining a protruding contour of the plane area as the second contour.

* * * * *